United States Patent
Homma et al.

(10) Patent No.: US 11,840,186 B2
(45) Date of Patent: Dec. 12, 2023

(54) VEHICLE OCCUPANT NOTIFICATION APPARATUS

(71) Applicant: SUBARU CORPORATION, Tokyo (JP)

(72) Inventors: Takuya Homma, Tokyo (JP); Kei Fuji, Tokyo (JP); Shinichi Miyamoto, Tokyo (JP); Atsuya Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 107 days.

(21) Appl. No.: 17/369,481

(22) Filed: Jul. 7, 2021

(65) Prior Publication Data

US 2022/0032869 A1 Feb. 3, 2022

(30) Foreign Application Priority Data

Jul. 30, 2020 (JP) .................................. 2020-129718

(51) Int. Cl.
*B60R 21/015* (2006.01)
*B60K 35/00* (2006.01)
*B60R 21/01* (2006.01)

(52) U.S. Cl.
CPC ........ *B60R 21/01548* (2014.10); *B60K 35/00* (2013.01); *B60K 2370/158* (2019.05); *B60R 2021/01265* (2013.01)

(58) Field of Classification Search
CPC ...... B60R 2022/485; B60R 2022/4816; B60R 2022/4825; B60R 22/48; B60R 21/01544; B60R 21/01548
See application file for complete search history.

(56) References Cited

U.S. PATENT DOCUMENTS 4,966,394 A * 10/1990 Thomas .................. B60R 22/44
280/807
5,558,370 A * 9/1996 Behr ..................... B60R 21/015
242/390.8

(Continued)

FOREIGN PATENT DOCUMENTS

JP 2020-057079 A 4/2020
KR 20140142584 A * 12/2014 ............. B60R 22/34

OTHER PUBLICATIONS

Bae et al., Active Seat Belt Apparatus and Vehicle, Dec. 12, 2014, KR, KR 2014-0142584 A, Machine Translation of Description (Year: 2014).*

*Primary Examiner* — James A English
(74) *Attorney, Agent, or Firm* — MCGINN I.P. LAW GROUP, PLLC

(57) ABSTRACT

A vehicle occupant notification apparatus provides a notification to a vehicle occupant by retracting a seatbelt of a vehicle and includes an operation-amount measuring instrument, an arithmetic controller, and a retraction device. The operation-amount measuring instrument measures a measurement seatbelt operation amount when the vehicle occupant sits on a seat of the vehicle and fastens the seatbelt. The measurement seatbelt operation amount is either one of a measurement seatbelt pull-out amount and a measurement seatbelt pull-out angle. The arithmetic controller determines whether the measurement seatbelt operation amount is larger than or equal to a predetermined value. The retraction device varies a retraction amount in the retraction of the seatbelt when the notification is to be provided by retracting the seatbelt based on a command from the arithmetic controller. The command indicates that the measurement seatbelt operation amount is larger than or equal to the predetermined value.

16 Claims, 5 Drawing Sheets

(56) References Cited

U.S. PATENT DOCUMENTS

| | | | |
|---|---|---|---|
| 10,328,888 B2* | 6/2019 | Pline | B60R 21/01544 |
| 2011/0148176 A1* | 6/2011 | Bolton | B60R 22/44 |
| | | | 701/45 |
| 2015/0251618 A1* | 9/2015 | Ghannam | B60R 22/48 |
| | | | 340/457.1 |
| 2017/0291575 A1* | 10/2017 | Le | G01B 7/026 |
| 2019/0252418 A1* | 8/2019 | Kao | H01L 29/78675 |
| 2020/0331429 A1* | 10/2020 | Thomas | B60R 22/34 |

* cited by examiner

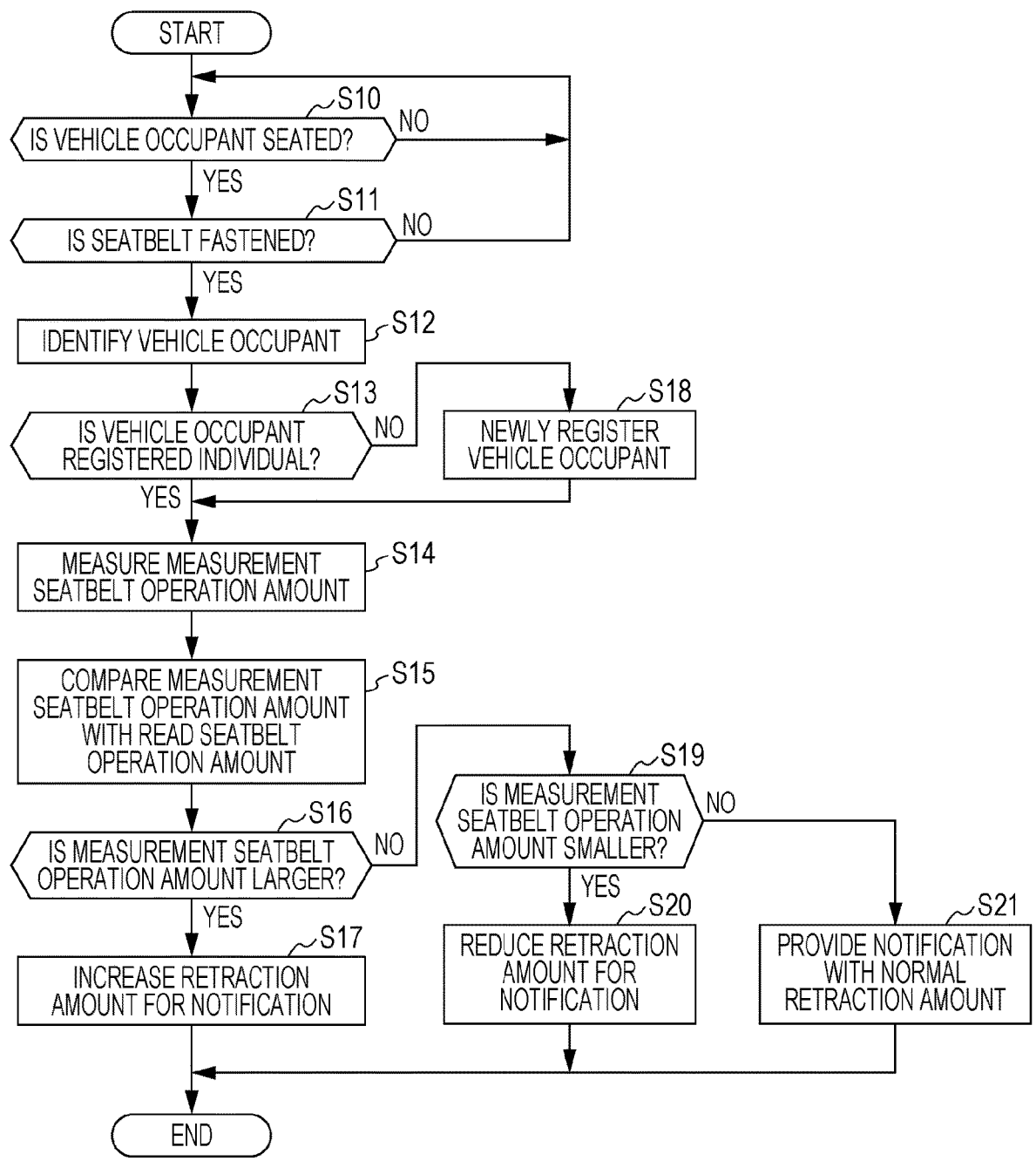

VEHICLE OCCUPANT NOTIFICATION APPARATUS

CROSS-REFERENCE TO RELATED APPLICATIONS

The present application claims priority from Japanese Patent Application No. 2020-129718 filed on Jul. 30, 2020, the entire contents of which are hereby incorporated by reference.

BACKGROUND

The disclosure relates to vehicle occupant notification apparatuses, and particularly, to a vehicle occupant notification apparatus that provides a notification to a vehicle occupant by retracting a seatbelt.

Some vehicles in recent years are equipped with safety-related notification functions (e.g., see Japanese Unexamined Patent Application Publication No. 2020-57079). When such a vehicle experiences a change in the travel environment while the vehicle is traveling, the vehicle occupant is notified of the change. Accordingly, the vehicle occupant can recognize that there may be a risk in terms of safety, thereby achieving increased safety when the vehicle is traveling.

One of methods for providing a notification to a vehicle occupant involves periodically retracting the seatbelt that the vehicle occupant is wearing. With this method, a tightening force generated as a result of the seatbelt retraction is applied to the body of the vehicle occupant, whereby the vehicle occupant can perceive the notification.

SUMMARY

An aspect of the disclosure provides a vehicle occupant notification apparatus configured to provide a notification to a vehicle occupant by retracting a seatbelt of a vehicle. The vehicle occupant notification apparatus includes an operation-amount measuring instrument, an arithmetic controller, and a retraction device. The operation-amount measuring instrument is configured to measure a measurement seatbelt operation amount when the vehicle occupant sits on a seat of the vehicle and fastens the seatbelt. The measurement seatbelt operation amount includes either one of a measurement seatbelt pull-out amount that is a length by which the seatbelt is pulled out and a measurement seatbelt pull-out angle that is an angle at which the seatbelt is pulled out. The arithmetic controller is configured to determine whether the measurement seatbelt operation amount is larger than or equal to a predetermined value set in advance. The retraction device is configured to vary a retraction amount in the retraction of the seatbelt when the notification is to be provided by retracting the seatbelt based on a command from the arithmetic controller. The command indicates that the measurement seatbelt operation amount is larger than or equal to the predetermined value.

An aspect of the disclosure provides a vehicle occupant notification apparatus configured to provide a notification to a vehicle occupant by retracting a seatbelt of a vehicle. The vehicle occupant notification apparatus includes a retraction device and circuitry. The circuitry is configured to measure a measurement seatbelt operation amount when the vehicle occupant sits on a seat of the vehicle and fastens the seatbelt. The measurement seatbelt operation amount includes either one of a measurement seatbelt pull-out amount that is a length by which the seatbelt is pulled out and a measurement seatbelt pull-out angle that is an angle at which the seatbelt is pulled out. The circuitry is configured to determine whether the measurement seatbelt operation amount is larger than or equal to a predetermined value set in advance. The circuitry is configured to cause the retraction device is configured to vary a retraction amount in the retraction of the seatbelt when the notification is to be provided by retracting the seatbelt based on a command from the circuitry. The command indicates that the measurement seatbelt operation amount is larger than or equal to the predetermined value.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 3 is a flowchart of operation performed by the vehicle occupant notification apparatus according to the embodiment of the disclosure.

FIG. 5A is a front view illustrating a method for measuring a measurement seatbelt pull-out angle. FIG. 5B is a side view illustrating a method for measuring a measurement seatbelt pull-out angle. FIG. 5C is a graph illustrating a correlation among the measurement seatbelt pull-out angles and the physique of a vehicle occupant.

DETAILED DESCRIPTION

With the above-described notification method using the seatbelt, it is conceivable that there may be a case where the notification may not be provided accurately to the vehicle occupant.

In detail, in a case where the vehicle occupant sitting on the seat is heavily dressed than usual, even when the notification is provided to the vehicle occupant by retracting the seatbelt, the tightening force generated as a result of the seatbelt retraction is absorbed by the thick clothing. As a result, the tightening force generated by the seatbelt retraction is not sufficiently transmitted to the body of the vehicle occupant. In this case, it may be conceivable that the vehicle occupant is not able to sufficiently perceive the notification, possibly resulting in reduced safety when the vehicle is traveling.

Furthermore, in a case where the vehicle occupant sitting on the seat is positioned differently than usual or has a large body frame, it may be conceivable that the notification according to the seatbelt retraction is not sufficiently perceived by the seated vehicle occupant.

It is desirable to provide a vehicle occupant notification apparatus that can reliably provide a notification to a vehicle occupant by retracting a seatbelt.

A vehicle occupant notification apparatus according to an embodiment of the disclosure will be described in detail below with reference to the drawings. With regard to the front, rear, up, down, left, and right directions to be used in the following description, the terms "left" and "right" respectively refer to left and right sides as viewed from the front of a vehicle 10. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
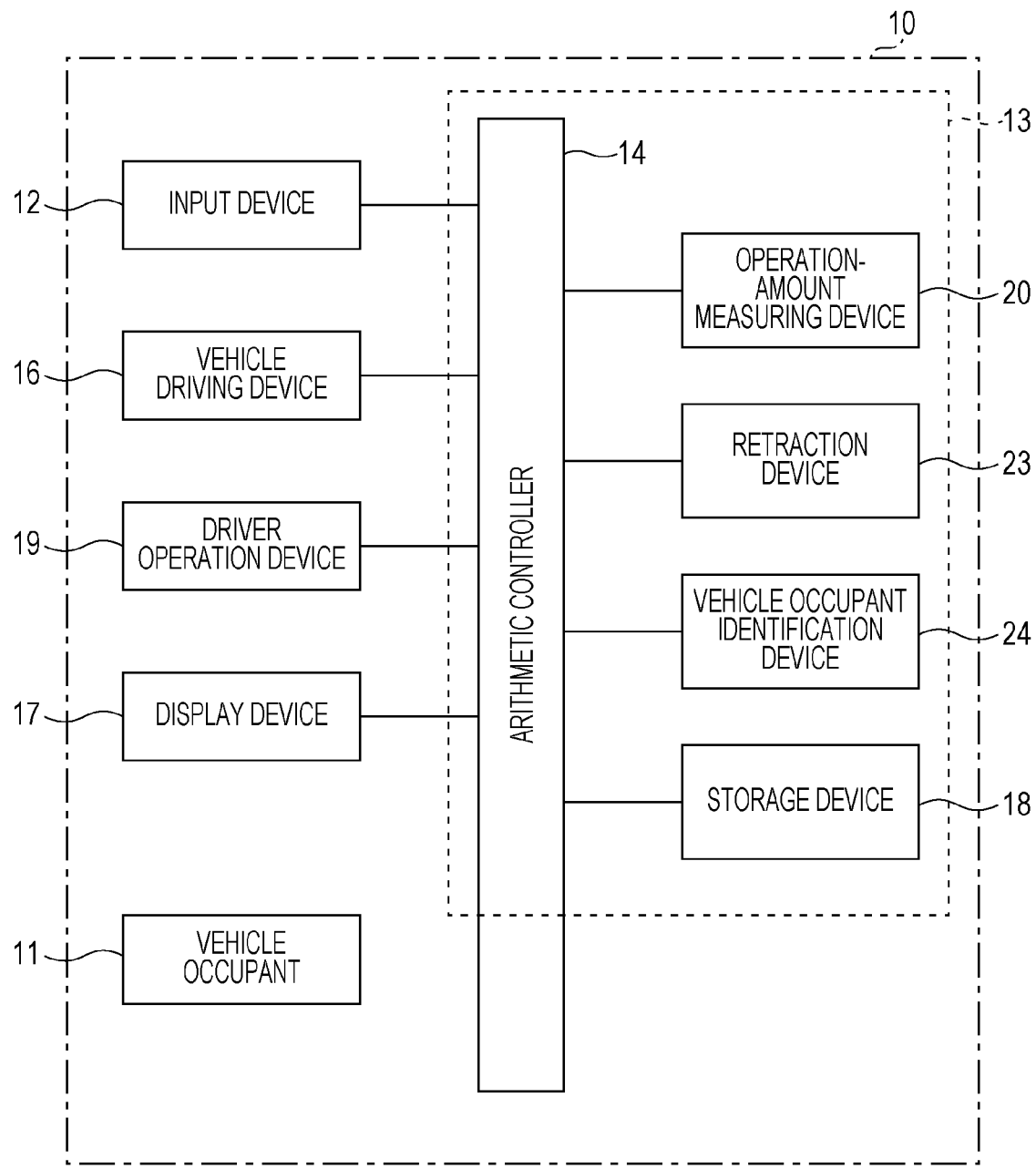
FIG. 1 is a block diagram illustrating a coupling configuration of a vehicle equipped with a vehicle occupant notification apparatus according to an embodiment of the disclosure.

FIG. 1 is a block diagram illustrating a coupling configuration of the vehicle 10 equipped with a vehicle occupant notification apparatus 13.

Referring to FIG. 1, the vehicle 10 mainly has an arithmetic controller 14, an input device 12, a vehicle driving device 16, a driver operation device 19, a display device 17, an operation-amount measuring instrument 20, a retraction device 23, a vehicle occupant identification device 24, and a storage device 18.

Furthermore, the vehicle 10 has, for example, an automated driving function and can be driven in any one of a fully automated driving mode, a semi-automated driving mode, and a manual driving mode. For example, a fully automated driving mode is a driving mode in which the arithmetic controller 14 steers the vehicle 10 and adjusts the vehicle speed thereof. A semi-automated driving mode is a driving mode in which a vehicle occupant 11 performs at least one of the steering of the vehicle 10 and the vehicle-speed adjustment. A manual driving mode is a driving mode in which the vehicle occupant 11 performs both the steering and the vehicle-speed adjustment.

The arithmetic controller 14 serves as a controller of the vehicle 10 and is, for example, an electronic control unit (ECU) including an arithmetic unit that performs various kinds of arithmetic processes. The arithmetic controller 14 executes a predetermined arithmetic process for causing the vehicle 10 to travel based on, for example, input information input from the input device 12. Moreover, the arithmetic controller 14 also executes a predetermined arithmetic process for causing the vehicle occupant notification apparatus 13 to operate.

The input device 12 includes, a switch, such as a push button, and a touchscreen operable by the vehicle occupant 11 serving as a driver. The vehicle occupant 11 may operate the input device 12 to perform an automated driving setting process and to give a command for starting and terminating automated driving.

The vehicle driving device 16 includes an engine and a motor serving as driving sources for causing the vehicle 10 to travel. Moreover, the vehicle driving device 16 also performs acceleration, deceleration, and steering of the vehicle 10 in accordance with an operation amount of the driver operation device 19.

The driver operation device 19 is configured to receive an operation performed by a driver 11 driving the vehicle 10 for steering the vehicle 10 and for adjusting the vehicle speed thereof. In detail, the driver operation device 19 has a steering wheel (not illustrated), an accelerator pedal (not illustrated), and a brake pedal (not illustrated).

The display device 17 is constituted of, for example, a liquid crystal panel disposed in either one of a dashboard and the vicinity thereof inside the vehicle cabin, and displays travel-related information of the vehicle 10 as a notification to the driver 11.

The operation-amount measuring instrument 20 measures an operation amount of a seatbelt 32 when the vehicle occupant 11 sits on a seat 25, to be described later, and fastens the seatbelt 32, to be described later. For example, when the vehicle occupant 11 sits on the seat 25 and fastens the seatbelt 32, the operation-amount measuring instrument 20 measures a measurement seatbelt operation amount including either one of a measurement seatbelt pull-out amount as a length by which the seatbelt 32 is pulled out and a measurement seatbelt pull-out angle (either one of θ11 and θ12 to be described later) as an angle at which the seatbelt 32 is pulled out.

The retraction device 23 is configured to retract the seatbelt 32, to be described later, when a notification is to be provided to the vehicle occupant 11, and includes, for example, a motor for winding up the seatbelt 32. Furthermore, as will be described later, the retraction device 23 increases the retraction amount by which the seatbelt 32 is to be retracted when the notification is to be provided by periodically retracting the seatbelt 32 based on a command from the arithmetic controller 14 indicating that the measurement seatbelt operation amount is larger than or equal to a predetermined value set in advance.

The vehicle occupant identification device 24 is for identifying the vehicle occupant 11 sitting on the seat 25, to be described later. Examples of the vehicle occupant identification device 24 include an image sensor that captures an image of the face of the vehicle occupant 11 inside the vehicle 10, and a weight sensor that measures the weight of the vehicle occupant 11 sitting on the seat 25.

The storage device 18 is constituted of a random access memory (RAM) and a read only memory (ROM), and stores information to be used for the traveling of the vehicle 10. The storage device 18 stores a program to be used for executing the operation of the vehicle occupant notification apparatus 13. Moreover, in a case where a plurality of vehicle occupants 11 are seated on seats 25, the storage device 18 can store captured image data of the face of each vehicle occupant 11 and data indicating biological information, such as the weight, of the relevant vehicle occupant 11 in association with the relevant vehicle occupant 11.

The vehicle occupant notification apparatus 13 according to this embodiment provides a notification to the vehicle occupant 11 by periodically retracting the seatbelt 32. Of the devices described above, the vehicle occupant notification apparatus 13 includes, for example, the operation-amount measuring instrument 20, the retraction device 23, the vehicle occupant identification device 24, the storage device 18, and the arithmetic controller 14.

Figure 2:
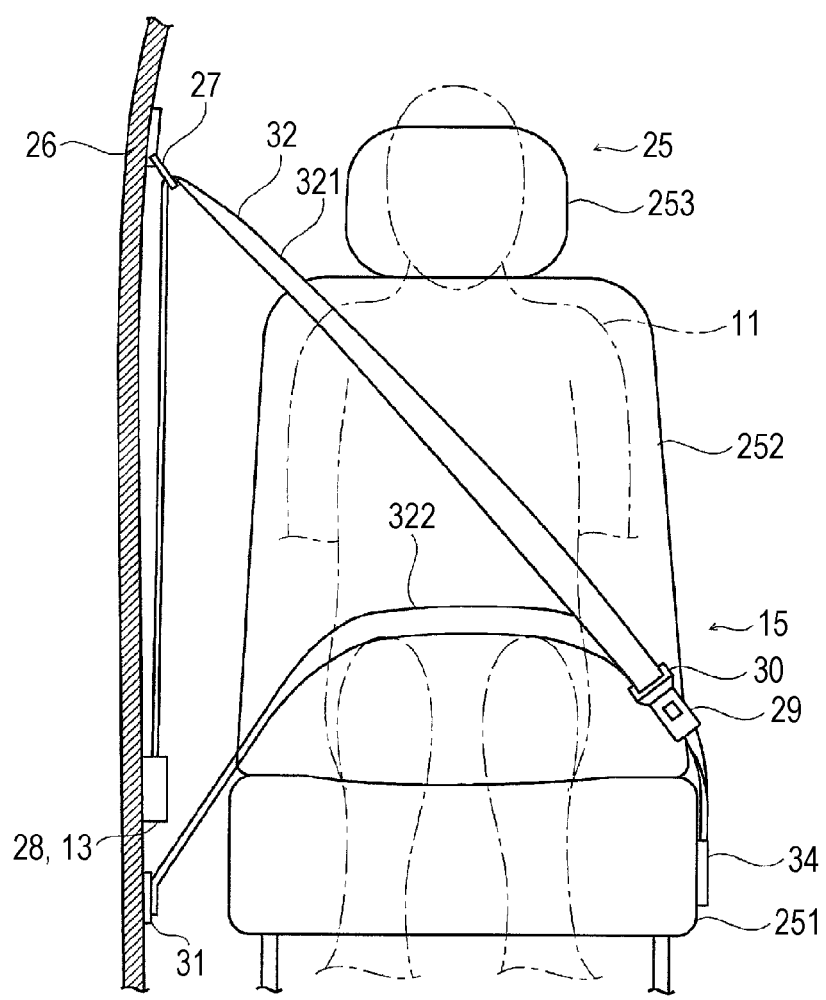
FIG. 2 is a front view illustrating a seat equipped with the vehicle occupant notification apparatus according to the embodiment of the disclosure.

FIG. 2 is a front view illustrating the seat 25 equipped with the vehicle occupant notification apparatus 13. In this case, the vehicle occupant 11 sitting on the seat 25 is wearing a seatbelt device 15.

The seat 25 has a seat cushion 251, a seat back 252, and a head rest 253 in that order from the bottom. The vehicle occupant 11 is sitting on the seat 25.

The seatbelt device 15 has a retractor 28, the seatbelt 32, a tongue plate 30, and a buckle 29.

The retractor 28 is provided in, for example, a lower area of a pillar 26 serving as a B-pillar. The retractor 28 has a belt reel (not illustrated) that winds and retains the seatbelt 32 into a housing thereof, and a winding spring mechanism (not illustrated) that constantly biases the belt reel in the winding direction. The retractor 28 may have an electric mechanism that uses a motor to wind and unwind the seatbelt 32. Furthermore, as will be described later, such an electric winding mechanism may also function as the retraction device 23 of the vehicle occupant notification apparatus 13.

The seatbelt 32 has one end attached to the retractor 28, extends through a through-ring 27 fixed to an upper area of the pillar 26, has an intermediate segment extending through the tongue plate 30, and has the other end fixed to an end 31 at the lower area of the pillar 26.

The tongue plate 30 is attached to the buckle 29 and has a hole through which the seatbelt 32 extends. The distal end of the tongue plate 30 is to be inserted into and fastened to the buckle 29.

The buckle 29 is fixed to a lower edge of the seat 25 by using an anchor 34.

The seatbelt 32 is a uniform-width belt formed of any one of woven polyester, woven carbon, and woven cloth.

In a state where the vehicle occupant 11 is seated on the seat 25, the seatbelt 32 is extended across the body of the vehicle occupant 11, and the tongue plate 30 is inserted into and fastened to the buckle 29. Accordingly, a torso seatbelt 321 extended diagonally across the upper body of the vehicle occupant 11 that restrains the shoulders and the waist of the vehicle occupant 11, and a waist seatbelt 322 extended horizontally across the waist of the vehicle occupant 11 that restrains the waist of the vehicle occupant 11 to the seat 25.

The vehicle occupant notification apparatus 13 according to this embodiment may be realized as a winding function of the retractor 28. Furthermore, a device that winds and unwinds the seatbelt 32 may be provided independently of the retractor 28, and such a device may also be used as the vehicle occupant notification apparatus 13.

A notification method in the above-described vehicle 10 will now be described in detail with reference to FIG. 3 and onward. FIG. 3 is a flowchart of operation performed by the vehicle occupant notification apparatus 13.

The notification according to this embodiment is to be provided in response to a change in the safety-related situation while the vehicle 10 is traveling. For example, the notification is to be provided when the driving mode of the vehicle 10 transitions from either one of the fully automated driving mode and the semi-automated driving mode to the manual driving mode, when the driving mode transitions from the semi-automated driving mode to the manual driving mode, or when the driving mode transitions from a semi-automated driving mode with a high automation level to a semi-automated driving mode with a low automation level. By providing such a notification, the notification can be reliably provided to the vehicle occupant 11, thereby causing the vehicle occupant 11 to effectively intervene in the driving operation.

First, in step S10, the arithmetic controller 14 determines whether the vehicle occupant 11 is sitting on the seat 25. This determination is performed by the arithmetic controller 14 based on an output from either one of the weight sensor disposed in the seat cushion 251 and the image sensor disposed in the vehicle cabin.

If the determination result in step S10 indicates "YES", the arithmetic controller 14 proceeds to step S11.

If the determination result in step S10 indicates "NO", the arithmetic controller 14 returns to step S10.

In step S11, the arithmetic controller 14 determines whether the vehicle occupant 11 is wearing the seatbelt 32. This determination is performed by the arithmetic controller 14 based on an output from either one of a sensor disposed in the buckle 29 and the image sensor disposed in the vehicle cabin.

If the determination result in step S11 indicates "YES", the arithmetic controller 14 proceeds to step S12.

If the determination result in step S11 indicates "NO", the arithmetic controller 14 returns to step S10.

In step S12, the vehicle occupant 11 sitting on the seat 25 is identified. For example, this identification can be performed by using captured image data of the face of the vehicle occupant 11. In detail, the image sensor (i.e., a driver monitoring system (DMS)) disposed in the vehicle cabin of the vehicle 10 captures the face of the vehicle occupant 11 so as to obtain captured image data. On the other hand, the arithmetic controller 14 reads read image data of faces of registered individuals from the storage device 18 illustrated in FIG. 1, and compares the captured image data with the read image data.

In step S13, it is determined whether the vehicle occupant 11 is a registered individual. In detail, the arithmetic controller 14 compares the read image data read from the storage device 18 with the captured image data, and determines that the vehicle occupant 11 is already registered if the captured image data matches any of the read image data. In contrast, if the captured image data does not match any of the read image data, the arithmetic controller 14 determines that the vehicle occupant 11 is not registered.

If the determination result in step S13 indicates "YES", that is, if the vehicle occupant 11 is already registered, the arithmetic controller 14 proceeds to step S14.

If the determination result in step S13 indicates "NO", that is, if the vehicle occupant 11 is not registered, the arithmetic controller 14 proceeds to step S18.

In step S14, the arithmetic controller 14 measures the measurement seatbelt operation amount. The measurement seatbelt operation amount is, for example, one of or both of the measurement seatbelt pull-out amount and the measurement seatbelt pull-out angle. The measurement seatbelt pull-out amount is a length by which the seatbelt 32 is pulled out in step S11 described above. The measurement seatbelt pull-out angle is an angle at which the seatbelt 32 is pulled out by the vehicle occupant 11 in step S11 described above.

Figure 4A:
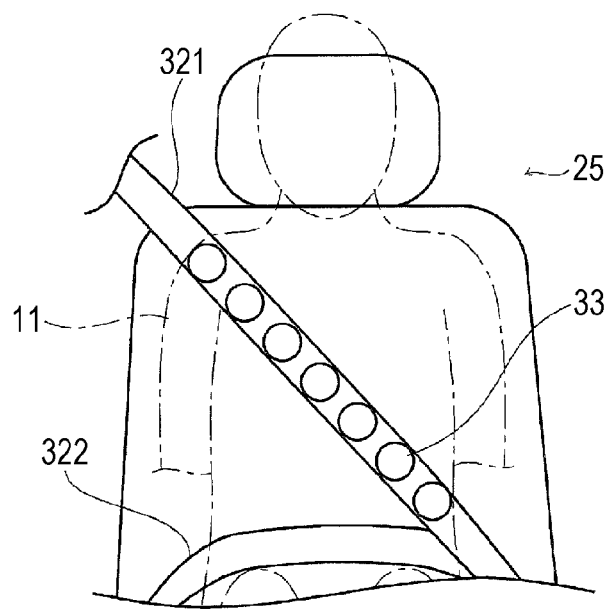
FIG. 4A and FIG. 4B illustrate the vehicle occupant notification apparatus according to the embodiment of the disclosure and illustrate a method for measuring a pull-out amount of a seatbelt by using markings.
Figure 4B:
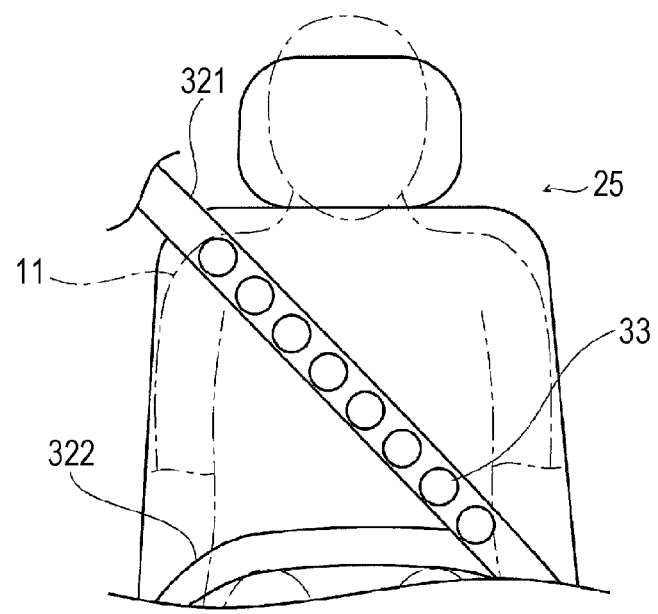

The measurement seatbelt pull-out amount will now be described with reference to FIG. 4A and FIG. 4B. FIG. 4A and FIG. 4B schematically illustrate a method for measuring the pull-out amount of the seatbelt 32 by using markings 33. FIG. 4A illustrates a case where the vehicle occupant 11 is lightly dressed, whereas FIG. 4B illustrates a case where the vehicle occupant 11 is heavily dressed.

Referring to FIG. 4A, the torso seatbelt 321 is provided with the markings 33. The markings 33 are spaced apart substantially evenly in the lengthwise direction of the torso seatbelt 321. In the case where the vehicle occupant 11 is lightly dressed, the number of markings 33 in an area where the body of the vehicle occupant 11 and the torso seatbelt 321 overlap is small. For example, in this case, seven markings 33 are illustrated. In this embodiment, for example, the aforementioned DMS captures an image of the vehicle occupant 11 from the front and counts the number of markings 33, thereby measuring the measurement seatbelt pull-out amount.

Referring to FIG. 4B, in the case where the vehicle occupant 11 is heavily dressed, eight markings 33 are indicated on the torso seatbelt 321 in the area where the body of the vehicle occupant 11 and the torso seatbelt 321 overlap. Thus, as compared with the case of FIG. 4A in which the vehicle occupant 11 is lightly dressed, a larger number of markings 33 are illustrated. Thus, the DMS captures an image of the vehicle occupant 11 from the front and recognizes that there are a larger number of markings 33, thereby recognizing that the measurement seatbelt operation amount is larger.

Figure 5A:
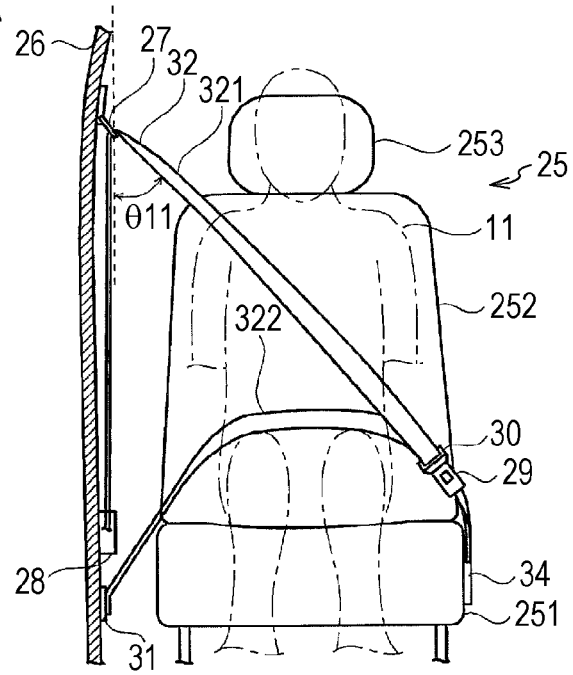
FIG. 5A to FIG. 5C illustrate the vehicle occupant notification apparatus according to the embodiment of the disclosure.

The measurement seatbelt pull-out angle will now be described with reference to FIG. 5A to FIG. 5C. FIG. 5A is a front view illustrating a method for measuring the measurement seatbelt pull-out angle θ11, FIG. 5B is a schematic diagram illustrating a method for measuring the measurement seatbelt pull-out angle θ12, and FIG. 5C is a graph illustrating a correlation among the measurement seatbelt pull-out angle θ11, the measurement seatbelt pull-out angle θ12, and the physique of the vehicle occupant 11.

Figure 5B:
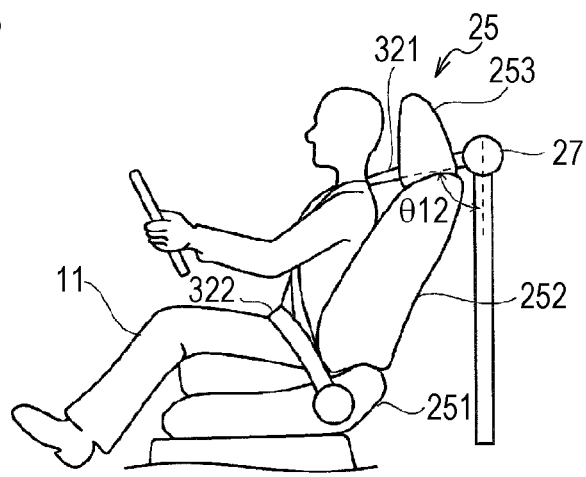
Figure 5C:
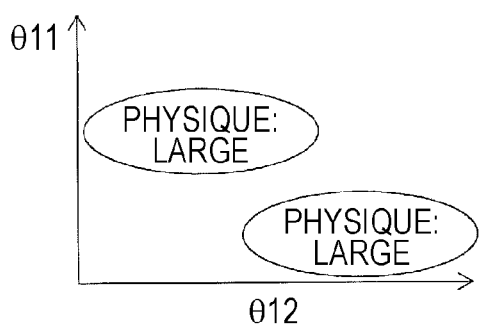

The measurement seatbelt pull-out angle used may be one of or both of the measurement seatbelt pull-out angle θ11 illustrated in FIG. 5A and the measurement seatbelt pull-out angle θ12 illustrated in FIG. 5B.

Referring to FIG. 5A, in a front view of the seat 25, the measurement seatbelt pull-out angle θ11 is an angle formed between a vertical line indicated by a dotted line and the torso seatbelt 321 when the vehicle occupant 11 sitting on the seat 25 fastens the seatbelt 32. In other words, the measurement seatbelt pull-out angle θ11 is an aperture angle that increases as the torso seatbelt 321 is pulled out sideways.

Referring to FIG. 5B, in a side view of the seat 25, the measurement seatbelt pull-out angle θ12 is an angle formed between a vertical line indicated by a dotted line and the torso seatbelt 321 when the vehicle occupant 11 sitting on the seat 25 fastens the seatbelt 32. In other words, the measurement seatbelt pull-out angle θ12 is a rotational angle by which the torso seatbelt 321 rotates forward.

The measurement seatbelt pull-out angle θ11 and the measurement seatbelt pull-out angle θ12 described above can be measured by using either one of the image sensor disposed in the vehicle cabin and an angle sensor provided in the vicinity of the through-ring 27.

In the graph illustrated in FIG. 5C, the ordinate axis indicates the measurement seatbelt pull-out angle θ11, whereas the abscissa axis indicates the measurement seatbelt pull-out angle θ12. Referring to this graph, the measurement seatbelt pull-out angle θ11 and the physique of the vehicle occupant 11 have a positive correlation with each other. That is, in a case where the measurement seatbelt pull-out angle θ11 is large, it is estimated that the vehicle occupant 11 has a large physique. Furthermore, the measurement seatbelt pull-out angle θ12 and the physique of the vehicle occupant 11 have a positive correlation with each other. That is, in a case where the measurement seatbelt pull-out angle θ12 is large, it is estimated that the vehicle occupant 11 has a large physique.

The storage device 18 stores data indicating the physique of each vehicle occupant 11 in association with the relevant individual. For example, the storage device 18 stores the name of the vehicle occupant 11, the captured image data of the face of the vehicle occupant 11, the weight of the vehicle occupant 11, a read seatbelt pull-out amount of the seatbelt 32 when the seatbelt 32 is fastened, and read seatbelt pull-out angles (i.e., the measurement seatbelt pull-out angle θ11 and the measurement seatbelt pull-out angle θ12 illustrated in FIG. 5A and FIG. 5B) in association with one another.

In step S15, the arithmetic controller 14 compares the measurement seatbelt operation amount measured in step S14 with the read seatbelt operation amount stored in the storage device 18. The measurement seatbelt operation amount in this case is any one of or a plurality of, for example, the measurement seatbelt pull-out amount illustrated in FIG. 4A and FIG. 4B and the measurement seatbelt pull-out angle θ11 and the measurement seatbelt pull-out angle θ12 illustrated in FIG. 5A and FIG. 5B. The read seatbelt operation amount is any one of or a plurality of the read seatbelt pull-out amount and the read seatbelt pull-out angles.

In step S16, the arithmetic controller 14 determines whether an amount of change in the measurement seatbelt operation amount relative to the read seatbelt operation amount is large, that is, whether there is a change in the dressed status or the position of the vehicle occupant 11 sitting on the seat 25. For example, referring to FIG. 4A and FIG. 4B, if the seatbelt pull-out length is larger than the read seatbelt pull-out amount by a predetermined value or more, the arithmetic controller 14 determines that the amount of change in the measurement seatbelt operation amount is large and that there is a possibility that the vehicle occupant 11 is heavily dressed. Furthermore, referring to FIG. 5A, if the measurement seatbelt pull-out angle θ11 is larger than the read seatbelt pull-out angle by a predetermined value or more, the arithmetic controller 14 determines that the amount of change in the measurement seatbelt operation amount is large and that there is a possibility that the vehicle occupant 11 is heavily dressed. Moreover, referring to FIG. 5B, if the measurement seatbelt pull-out angle θ12 is larger than the read seatbelt pull-out angle by a predetermined value or more, the arithmetic controller 14 determines that the amount of change in the measurement seatbelt operation amount is large and that there is a possibility that the vehicle occupant 11 is heavily dressed.

The determination process in step S16 can be performed by using any one of or a plurality of the measurement seatbelt pull-out amount, the measurement seatbelt pull-out angle θ11, and the measurement seatbelt pull-out angle θ12.

Moreover, the determination process in step S16 can be performed by using the weight of the vehicle occupant 11. In detail, an output from a seat pressure sensor disposed in the seat cushion 251 is used. Then, if the measurement seatbelt operation amount is large in a situation where there is no significant change in the seat pressure, the arithmetic controller 14 can determine that step S17 is to be performed since the vehicle occupant 11 is heavily dressed.

If the determination result in step S16 indicates "YES", that is, if it is assumed that the vehicle occupant 11 is heavily dressed, the arithmetic controller 14 proceeds to step S17.

If the determination result in step S16 indicates "NO", that is, if it is assumed that the vehicle occupant 11 is not heavily dressed, the arithmetic controller 14 proceeds to step S19.

In step S17, the arithmetic controller 14 increases the retraction amount for the notification. In this case, for example, the notification involves notifying the vehicle occupant 11 that the driving mode of the vehicle 10 is to transition from either one of the fully automated driving mode and the semi-automated driving mode to the manual driving mode. Accordingly, the vehicle occupant 11 can accurately perceive the notification and safely steer the vehicle 10 and adjust the vehicle speed thereof.

In detail, referring to FIG. 2, the retractor 28 serving as the vehicle occupant notification apparatus 13 periodically retracts the seatbelt 32 based on a command from the arithmetic controller 14 in step S17, so that the torso seatbelt 321 provides a sensible notification to the torso of the vehicle occupant 11. In this embodiment, if the operation amount of the seatbelt 32 is large when the vehicle occupant 11 fastens the seatbelt 32, the retraction amount of the seatbelt 32 for the sensible notification is increased. Accordingly, even in a case where the vehicle occupant 11 is heavily dressed than usual, the contact between the torso seatbelt 321 and the torso of the vehicle occupant 11 is increased, so that the sensible notification can be effectively provided to the torso of the vehicle occupant 11 through the thick clothing. Moreover, even in a case where the vehicle occupant 11 is positioned differently than usual, the sensible notification can be effectively provided to the vehicle occupant 11.

In step S18, the arithmetic controller 14 newly registers the vehicle occupant 11 sitting on the seat 25. Accordingly, an appropriate notification can be provided in accordance with the operation amount of the seatbelt 32 from the next boarding and onward. When step S18 is completed, the arithmetic controller 14 proceeds to step S14.

In step S19, the arithmetic controller 14 determines whether the measurement seatbelt operation amount is smaller than the read seatbelt operation amount by a predetermined value or more. For example, referring to FIG. 4A and FIG. 4B, if the seatbelt pull-out length is smaller than the read seatbelt pull-out amount by a predetermined value or more, the arithmetic controller 14 determines that there is a possibility that the vehicle occupant 11 is lightly dressed. Furthermore, referring to FIG. 5A, if the measurement seatbelt pull-out angle θ11 is smaller than the read seatbelt pull-out angle by a predetermined value or more, the arithmetic controller 14 determines that there is a possibility that the vehicle occupant 11 is lightly dressed. Moreover, referring to FIG. 5B, if the measurement seatbelt pull-out angle θ12 is smaller than the read seatbelt pull-out angle by a predetermined value or more, the arithmetic controller 14 determines that there is a possibility that the vehicle occupant 11 is lightly dressed.

If the determination result in step S19 indicates "YES", the arithmetic controller 14 proceeds to step S20.

If the determination result in step S19 indicates "NO", the arithmetic controller 14 proceeds to step S21.

In step S20, the arithmetic controller 14 provides a notification by retracting the seatbelt 32, similarly to step S17. Since it is conceivable that the vehicle occupant 11 is lightly dressed, the retraction amount of the seatbelt 32 for the notification may be smaller than that in step S17 and step S21. Accordingly, this may reduce excessive stimulation applied to the lightly-dressed vehicle occupant 11 when the notification is provided thereto by retracting the seatbelt 32.

In step S21, the arithmetic controller 14 provides a notification by retracting the seatbelt 32, similarly to step S17. Since a significant change in the physique of the vehicle occupant 11 is not confirmed here, the arithmetic controller 14 reduces the retraction amount of the seatbelt 32 for the notification relative to that in step S17 and increases the retraction amount relative to than in step S20. That is, the retraction amount of the seatbelt 32 for the notification is a normal retraction amount. Accordingly, an appropriate notification can be provided to the vehicle occupant 11.

The above-described embodiment can exhibit the following main advantageous effects.

In this embodiment, the retraction amount of the seatbelt 32 when a notification is to be provided is varied in accordance with the operation amount of the seatbelt 32. Thus, the retraction amount of the seatbelt 32 for the notification is varied in accordance with the physique of the vehicle occupant 11, so that the seatbelt 32 can be brought into close contact with the torso of the vehicle occupant 11, whereby the vehicle occupant 11 can effectively sense the notification provided in accordance with intermittent retraction of the seatbelt 32.

Furthermore, the retraction amount of the seatbelt 32 for the notification is varied in accordance with the amount of change in the measurement seatbelt operation amount relative to the read seatbelt operation amount. Thus, the retraction amount of the seatbelt 32 for the notification is varied in accordance with a change in the physique of the vehicle occupant 11, so that the seatbelt 32 can be brought into close contact with the torso of the vehicle occupant 11, whereby the vehicle occupant 11 can effectively sense the notification provided in accordance with intermittent retraction of the seatbelt 32.

Moreover, the boarding vehicle occupant 11 is identified by the vehicle occupant identification device 24, and the retraction amount by which the seatbelt 32 is to be retracted is varied when a difference between the read seatbelt operation amount of the vehicle occupant 11 and the read seatbelt pull-out amount during the boarding is larger than or equal to a predetermined value. Thus, the retraction amount of the seatbelt 32 for the notification is varied in accordance with the vehicle occupant 11, so that the seatbelt 32 can be brought into close contact with the torso of the vehicle occupant 11, whereby the notification can be provided more effectively.

Furthermore, with the measurement seatbelt pull-out amount and the measurement seatbelt pull-out angles serving as the measurement seatbelt operation amount, a change in the physique of the vehicle occupant 11 can be accurately detected based on the measurement seatbelt pull-out amount and the measurement seatbelt pull-out angles, whereby the notification according to the pull-out of the seatbelt 32 can be provided more accurately.

Moreover, the measurement seatbelt pull-out amount can be calculated using a simple method of counting the number of markings 33.

The above embodiment of the disclosure is not limited thereto and permits other various modifications so long as they do not depart from the scope of the disclosure. Moreover, different embodiments may be combined.

Referring to FIG. 2, the measurement seatbelt pull-out amount may be measured based on, for example, the rotational amount of the belt reel inside the retractor 28.

In step S12 illustrated in FIG. 3, the vehicle occupant 11 sitting on the seat 25 may be identified based on the weight of the vehicle occupant 11 measured using the seat pressure sensor provided in the seat cushion 251.

Referring to FIG. 4A and FIG. 4B, the markings 33 may have a shape other than a circular shape. In detail, the markings 33 may each have a linear shape extending in either one of the width direction and the longitudinal direction of the seatbelt 32. Furthermore, the markings 33 may each include any one of a specific color, an IC tag, and a magnetic tape. Moreover, a marking checker that checks the markings 33 may be provided at an outlet and/or an inlet of the seatbelt 32. The marking checker can check the markings 33 magnetically or by using an image. Furthermore, the marking checker may be a magnetic reader and/or an in-vehicle camera provided in the driver monitoring system, and may be capable of detecting a value based on which a seatbelt pull-out amount can be calculated.

The arithmetic controller 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the arithmetic controller 14 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the arithmetic controller 14 illustrated in FIG. 1.

The invention claimed is:

1. A vehicle occupant notification apparatus configured to provide a notification to a vehicle occupant by retracting a seatbelt of a vehicle, the vehicle occupant notification apparatus comprising:
   an operation-amount measuring instrument configured to measure a measurement seatbelt operation amount when the vehicle occupant sits on a seat of the vehicle and fastens the seatbelt, the measurement seatbelt operation amount comprising either one of a measurement seatbelt pull-out amount that is a length by which the seatbelt is pulled out and a measurement seatbelt pull-out angle that is an angle at which the seatbelt is pulled out;
   an arithmetic controller configured to determine whether the measurement seatbelt operation amount is larger than or equal to a predetermined value set in advance; and
   a retraction device configured to vary a retraction amount in the retraction of the seatbelt when the notification is to be provided by retracting the seatbelt based on a command from the arithmetic controller, the command indicating that the measurement seatbelt operation amount is larger than or equal to the predetermined value,
   a weight sensor that measures a weight of the vehicle occupant sitting on the seat,
   wherein the retraction device varies the retraction amount in the retraction of the seatbelt based on the weight of the vehicle occupant and either one of the measurement seatbelt pull-out amount and the measurement seatbelt pull-out angle,
   wherein the seatbelt includes:
      a torso seatbelt extended diagonally across an upper body of the vehicle occupant that restrains shoulders and waist of the vehicle occupant; and
      a waist seatbelt extended horizontally across the waist of the vehicle occupant that restrains the waist of the vehicle occupant to the seat, and
   wherein the measurement seatbelt pull-out angle includes:
      a first measurement seatbelt pull-out angle that is an aperture angle that increases as the torso seatbelt is pulled out sideways; and
      a second measurement seatbelt pull-out angle that is a rotational angle by which the torso seatbelt rotates forward.

2. The vehicle occupant notification apparatus according to claim 1, further comprising:
   a storage device configured to store a read seatbelt operation amount comprising either one of a read seatbelt pull-out amount and a read seatbelt pull-out angle,
   wherein the arithmetic controller is configured to determine whether an amount of change in the measurement seatbelt operation amount relative to the read seatbelt operation amount is larger than or equal to the predetermined value, and
   wherein the retraction device is configured to vary the retraction amount in the retraction of the seatbelt when the notification is to be provided by retracting the seatbelt based on the command from the arithmetic controller, the command indicating that the amount of change is larger than or equal to the predetermined value.

3. The vehicle occupant notification apparatus according to claim 2, further comprising:
   a vehicle occupant identification device configured to identify the vehicle occupant when the vehicle occupant sits on the seat,
   wherein the storage device reads the read seatbelt operation amount comprising either one of the read seatbelt pull-out amount associated with the identified vehicle occupant and the read seatbelt pull-out angle associated with the identified vehicle occupant,
   wherein the arithmetic controller is configured to compare the measurement seatbelt operation amount measured by the operation-amount measuring instrument with the read seatbelt operation amount read from the storage device when the vehicle occupant fastens the seatbelt, so as to determine whether the amount of change in the measurement seatbelt operation amount relative to the read seatbelt operation amount is larger than or equal to the predetermined value, and
   wherein the retraction device is configured to vary the retraction amount in the retraction of the seatbelt when the notification is to be provided by retracting the seatbelt based on the command from the arithmetic controller, the command indicating that the amount of change in the measurement seatbelt operation amount is larger than or equal to the predetermined value.

4. The vehicle occupant notification apparatus according to claim 3, wherein the measurement seatbelt pull-out amount is calculated based on a marking attached to the seatbelt.

5. The vehicle occupant notification apparatus according to claim 3, wherein the measurement seatbelt operation amount comprises the measurement seatbelt pull-out amount and the measurement seatbelt pull-out angle.

6. The vehicle occupant notification apparatus according to claim 5, wherein the measurement seatbelt pull-out amount is calculated based on a marking attached to the seatbelt.

7. The vehicle occupant notification apparatus according to claim 2, wherein the measurement seatbelt operation amount comprises the measurement seatbelt pull-out amount and the measurement seatbelt pull-out angle.

8. The vehicle occupant notification apparatus according to claim 7, wherein the measurement seatbelt pull-out amount is calculated based on a marking attached to the seatbelt.

9. The vehicle occupant notification apparatus according to claim 2, wherein the measurement seatbelt pull-out amount is calculated based on a marking attached to the seatbelt.

10. The vehicle occupant notification apparatus according to claim 1, wherein the measurement seatbelt operation amount comprises the measurement seatbelt pull-out amount and the measurement seatbelt pull-out angle.

11. The vehicle occupant notification apparatus according to claim 10, wherein the measurement seatbelt pull-out amount is calculated based on a marking attached to the seatbelt.

12. The vehicle occupant notification apparatus according to claim 1, wherein the measurement seatbelt pull-out amount is calculated based on a marking attached to the seatbelt.

13. The vehicle occupant notification apparatus according to claim 1, wherein the measurement seatbelt pull-out amount is calculated based on markings that are spaced apart substantially evenly in a lengthwise direction of the seatbelt.

14. The vehicle occupant notification apparatus according to claim 1, wherein the measurement seatbelt pull-out amount is calculated based on markings that are spaced apart substantially evenly in a lengthwise direction of the torso seatbelt.

15. A vehicle occupant notification apparatus configured to provide a notification to a vehicle occupant by retracting a seatbelt of a vehicle, the vehicle occupant notification apparatus comprising:
  a retraction device; and
  circuitry configured to:
    receive a measurement seatbelt operation amount when the vehicle occupant sits on a seat of the vehicle and fastens the seatbelt, the measurement seatbelt operation amount comprising either one of a measurement seatbelt pull-out amount that is a length by which the seatbelt is pulled out and a measurement seatbelt pull-out angle that is an angle at which the seatbelt is pulled out;
    determine whether the measurement seatbelt operation amount is larger than or equal to a predetermined value set in advance;
    cause the retraction device to vary a retraction amount in the retraction of the seatbelt when the notification is to be provided by retracting the seatbelt based on a command from the circuitry, the command indicating that the measurement seatbelt operation amount is larger than or equal to the predetermined value;
    measures a weight of the vehicle occupant sitting on the seat; and
    cause retraction device to vary the retraction amount in the retraction of the seatbelt based on the weight of the vehicle occupant and either one of the measurement seatbelt pull-out amount and the measurement seatbelt pull-out angle,
  wherein the seatbelt includes:
    a torso seatbelt extended diagonally across an upper body of the vehicle occupant that restrains shoulders and waist of the vehicle occupant; and
    a waist seatbelt extended horizontally across the waist of the vehicle occupant that restrains the waist of the vehicle occupant to the seat,
  wherein the measurement seatbelt pull-out angle includes:
    a first measurement seatbelt pull-out angle that is an aperture angle that increases as the torso seatbelt is pulled out sideways; and
    a second measurement seatbelt pull-out angle that is a rotational angle by which the torso seatbelt rotates forward.

16. A vehicle occupant notification apparatus configured to provide a notification to a vehicle occupant by retracting a seatbelt of a vehicle, the vehicle occupant notification apparatus comprising:
  an operation-amount measuring instrument configured to measure a measurement seatbelt operation amount when the vehicle occupant sits on a seat of the vehicle and fastens the seatbelt, the measurement seatbelt operation amount comprising a measurement seatbelt pull-out angle that is an angle at which the seatbelt is pulled out;
  an arithmetic controller configured to determine whether the measurement seatbelt operation amount is larger than or equal to a predetermined value set in advance; and
  a retraction device configured to vary a retraction amount in the retraction of the seatbelt when the notification is to be provided by retracting the seatbelt based on a command from the arithmetic controller, the command indicating that the measurement seatbelt operation amount is larger than or equal to the predetermined value,
  wherein the seatbelt includes:
    a torso seatbelt extended diagonally across an upper body of the vehicle occupant that restrains shoulders and waist of the vehicle occupant; and
    a waist seatbelt extended horizontally across the waist of the vehicle occupant that restrains the waist of the vehicle occupant to the seat,
  wherein the measurement seatbelt pull-out angle includes:
    a first measurement seatbelt pull-out angle that is an aperture angle that increases as the torso seatbelt is pulled out sideways; and
    a second measurement seatbelt pull-out angle that is a rotational angle by which the torso seatbelt rotates forward.

* * * * *